(12) United States Patent
Prim et al.

(10) Patent No.: US 7,837,971 B2
(45) Date of Patent: Nov. 23, 2010

(54) SULFUR REFINING PROCESS

(75) Inventors: Eric Prim, Midland, TX (US); Naomi Baker, The Woodlands, TX (US)

(73) Assignee: Yellow Hill LLC, Houston, TX (US)

( * ) Notice: Subject to any disclaimer, the term of this patent is extended or adjusted under 35 U.S.C. 154(b) by 0 days.

(21) Appl. No.: 12/506,368

(22) Filed: Jul. 21, 2009

(65) Prior Publication Data

US 2010/0021371 A1 Jan. 28, 2010

Related U.S. Application Data

(60) Provisional application No. 61/083,411, filed on Jul. 24, 2008.

(51) Int. Cl.
*B01J 19/00* (2006.01)
*C01B 17/02* (2006.01)

(52) U.S. Cl. .............. 423/578.1; 422/188; 422/194; 422/255; 422/261; 422/262; 422/292; 23/293 S

(58) Field of Classification Search .............. 423/578.1; 422/188, 194, 255, 261, 262, 292; 23/293 S
See application file for complete search history.

(56) References Cited

U.S. PATENT DOCUMENTS

| | | | |
|---|---|---|---|
| 2,941,868 A | 6/1960 | Brogdon, Jr. et al. | |
| 3,042,503 A | 7/1962 | Tuller et al. | |
| 3,304,158 A * | 2/1967 | Dale ....................... | 423/578.1 |
| 3,598,529 A | 8/1971 | Deschamps et al. | |
| T951,001 I4 * | 10/1976 | Fonsaca et al. ........... | 423/578.1 |
| 4,009,251 A | 2/1977 | Meuly | |
| 4,069,302 A | 1/1978 | Meadow | |
| 4,111,805 A * | 9/1978 | Van Pool et al. ......... | 423/578.1 |
| 4,175,112 A | 11/1979 | Lusk et al. | |
| 4,278,646 A | 7/1981 | Lynn et al. | |
| 4,283,379 A | 8/1981 | Fenton et al. | |
| 4,325,936 A | 4/1982 | Gowdy et al. | |
| 4,435,371 A | 3/1984 | Frech et al. | |
| 4,643,886 A | 2/1987 | Chang et al. | |
| 4,649,032 A | 3/1987 | Snavely et al. | |
| 4,664,902 A | 5/1987 | Fong et al. | |

(Continued)

FOREIGN PATENT DOCUMENTS

WO 03082455 A2 10/2003

OTHER PUBLICATIONS

Pandey, R.A., et al., "Desulfurization of Gaseous Fuels with Recovery of Elemental Sulfur: An Overview," Critical Reviews in Environmental Science and Technology, 29(3):229-268 (1999).

(Continued)

*Primary Examiner*—Timothy C Vanoy
(74) *Attorney, Agent, or Firm*—Conley Rose, P.C.; Grant Rodolph

(57) ABSTRACT

A process comprising contacting a solvent with a sulfur stream comprising sulfur and a contaminant, separating the sulfur from at least some of the contaminant and at least some of the solvent, thereby producing a decontaminated sulfur stream, contacting the decontaminated sulfur with a washing agent, and separating the sulfur from at least some of the washing agent, thereby producing a purified sulfur stream comprising elemental sulfur.

21 Claims, 1 Drawing Sheet

U.S. PATENT DOCUMENTS

| | | |
|---|---|---|
| 4,705,676 A | 11/1987 | Fong et al. |
| 4,741,888 A | 5/1988 | Fong et al. |
| 4,758,416 A | 7/1988 | Fong et al. |
| 4,781,910 A | 11/1988 | Van Dijk |
| 4,816,225 A | 3/1989 | Mathur et al. |
| 4,876,075 A | 10/1989 | Van Kleeck |
| 5,017,280 A | 5/1991 | Paris-Marcano |
| 5,049,370 A | 9/1991 | Hasebe et al. |
| 5,087,350 A | 2/1992 | Paris-Marcano |
| 5,093,094 A | 3/1992 | Van Kleeck et al. |
| 5,122,351 A | 6/1992 | Hardison |
| 5,202,107 A | 4/1993 | Kvasnikoff et al. |
| 5,403,571 A | 4/1995 | Chalkley et al. |
| 5,494,650 A | 2/1996 | Kvasnikoff et al. |
| 5,525,233 A | 6/1996 | Falkiner et al. |
| 5,578,189 A | 11/1996 | Joshi |
| 5,656,251 A | 8/1997 | Nagata et al. |
| 5,711,929 A | 1/1998 | Chalkley et al. |
| 5,733,516 A | 3/1998 | DeBerry |
| 5,824,282 A | 10/1998 | Nagata et al. |
| 6,334,991 B1 | 1/2002 | Strickland et al. |
| 6,511,937 B1 | 1/2003 | Bearden, Jr. et al. |
| 6,706,250 B2 | 3/2004 | Carrett et al. |
| 6,962,683 B2 | 11/2005 | Gangwal et al. |
| 2003/0103884 A1 | 6/2003 | Lynn |
| 2007/0238907 A1 | 10/2007 | Binder et al. |

OTHER PUBLICATIONS

Hua, Guo Xiong, et al., "The Evolution, Chemistry and Applications of Homogeneous Liquid Redox Sulfur Recovery Techniques," Comments on Inorganic Chemistry, 22:5, 327-351 (2001).

Hua, Guoxiong, et al., "Novel Non-Aqueous Fe(III) / Fe(II) Redox Couple for the Catalytic Oxidation of Hydrogen Sulfide to Sulfur by Air," The Royal Society of Chemistry, Dalton Transactions, 1147-1156 (2006).

* cited by examiner

SULFUR REFINING PROCESS

CROSS-REFERENCE TO RELATED APPLICATIONS

The present application claims priority to U.S. Provisional Patent Application 61/083,411, filed Jul. 24, 2008 by Eric Prim et al., and entitled "Sulfur Refining Process," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Natural gas streams that contain $H_2S$ must be treated to remove the $H_2S$ before the gas is suitable for transportation or sale. When the $H_2S$ concentration is sufficiently high, the sulfur cannot be emitted into the atmosphere due to safety concerns and environmental regulations. Instead, the $H_2S$ is processed into a liquid or solid product. For example, chelated metal processes can be used to convert $H_2S$ into elemental sulfur. One problem with these processes is that the elemental sulfur becomes contaminated with the extraction solvent and side reactions, e.g., chelated metals, thiosulfates, and bicarbonates, which make the sulfur a non-marketable, worthless waste product. Some contaminants can also make the sulfur a hazardous waste.

SUMMARY

In one embodiment, the disclosure includes a process comprising contacting a solvent with a sulfur stream comprising sulfur and a contaminant, separating the sulfur from at least some of the contaminant and at least some of the solvent, thereby producing a decontaminated sulfur stream, contacting the decontaminated sulfur with a washing agent, and separating the sulfur from at least some of the washing agent, thereby producing a purified sulfur stream comprising elemental sulfur.

In another embodiment, the disclosure includes a process comprising contacting an aqueous phase solvent with a sulfur stream comprising elemental sulfur and a plurality of contaminants, wherein the contaminants comprise metals, organic compounds, ash, and mercaptans, separating the sulfur from at least some of the contaminants and at least some of the solvent, thereby producing a decontaminated sulfur stream, contacting the decontaminated sulfur with water, separating the sulfur from at least some of the water, and heating the purified sulfur stream to homogenize the sulfur, reduce or substantially eliminate any remaining water and/or solvent, make the sulfur more suitable for sale or transportation, or combinations thereof, thereby producing a refined sulfur stream comprising at least about 95 weight percent elemental sulfur.

In a third embodiment, the disclosure includes an apparatus comprising a reactor configured to receive a sulfur stream and a solvent stream and produce a sulfur slurry stream, wherein the sulfur stream comprises sulfur and a contaminant, a first separator configured to receive the sulfur slurry stream and produce a spent solvent stream and a decontaminated sulfur stream, a washer configured to receive the decontaminated sulfur stream and a washing agent stream and produce a clean sulfur stream, and a second separator configured to receive the clean sulfur stream and produce a spent washing agent stream and a purified sulfur stream, wherein the purified sulfur stream comprises elemental sulfur and no more than about 5 weight percent of the contaminant.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
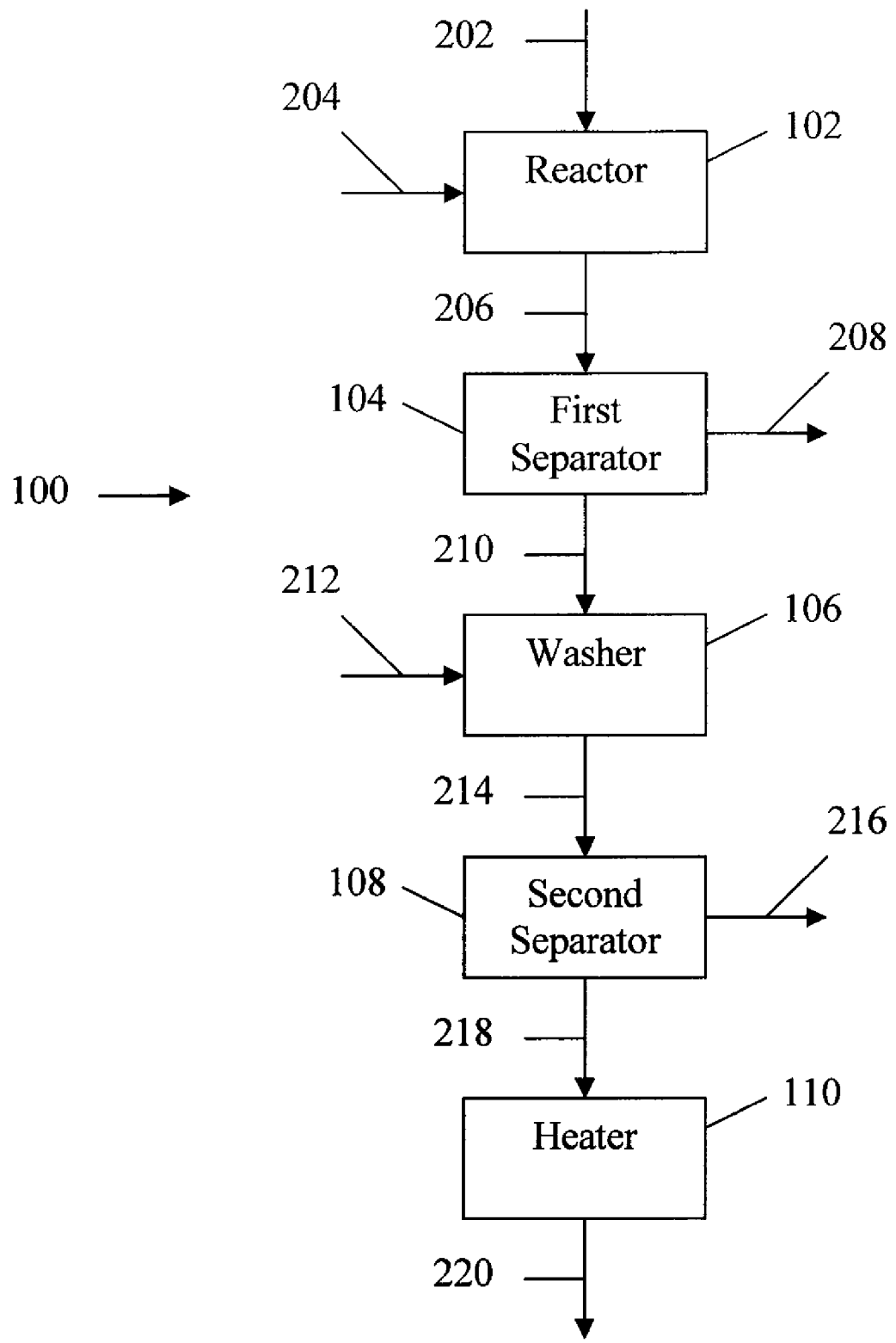
FIG. 1 is a process flow diagram of one embodiment of a sulfur refining process.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a process for refining sulfur to improve its purity. The process may contact a solvent with a sulfur stream comprising sulfur and at least one contaminant, such as metals, organic compounds, ash, mercaptans, or combinations thereof. The solvent may act upon the contaminants such that the sulfur can be separated from the contaminants and the solvent, thereby producing a decontaminated sulfur stream. The decontaminated sulfur stream may be washed with a washing agent, such as water, and subsequently separated from the washing agent to produce a purified sulfur stream. The purified sulfur stream may be heated to further refine the sulfur. The resulting refined sulfur stream may comprise at least about 99 weight percent elemental sulfur and may be substantially free of any mercaptans.

FIG. 1 illustrates an embodiment of the sulfur refining process 100. The process 100 may comprise contacting a contaminated sulfur stream 202 with a solvent stream 204 in a reactor 102, which produces a sulfur slurry stream 206. The sulfur slurry stream 206 may enter a first separator 104 where it may be separated into a spent solvent stream 208 and a decontaminated sulfur stream 210. The decontaminated sulfur stream 210 may then be contacted with a washing agent stream 212 in a washer 106, which produces a clean sulfur stream 214. The clean sulfur stream 214 may enter a second separator 108 where it may be separated into a spent washing agent stream 216 and a purified sulfur stream 218. Finally, the purified sulfur stream 218 may be heated in a heater 110 to produce a refined sulfur stream 220. The various streams and process steps illustrated in FIG. 1 are described in further detail below.

The contaminated sulfur stream 202 may comprise sulfur and at least one contaminant. In embodiments, the sulfur in the contaminated sulfur stream 202 may be in the form of elemental sulfur, sulfur-containing molecules, or combinations thereof. For example, the contaminated sulfur stream 202 may be obtained from the tail gas of a gas processing plant that employs an amine, mixed amine, direct oxidation, or any other $H_2S$ removal (e.g., sweetening) process. In a specific embodiment, the SULFEROX or LO-CAT sweetening processes may be used, such as the process disclosed in U.S. Pat. No. 4,758,416 by Fong et al. and entitled, "Removal of $H_2S$ from Gas Streams", which is incorporated herein by reference. Such sweetening processes may use chelated metals, such as iron and magnesium, or various organic compounds. Significant amounts of these compounds may remain in the sulfur. In some cases, the sweetening processes may produce or fail to remove substantial quantities of ash or other undesirable byproducts from the sulfur. As such, the contaminants may comprise metals, chelated metals, organic compounds, organometallic compounds, ash, thiosulfates, bicarbonates, mercaptans, other byproducts, or combinations thereof. The contaminants may be chemically, ionically, or mechanically bonded to the sulfur particles, or the contaminants may be adsorbed onto, absorbed into, or simply mixed with the sulfur particles. In embodiments, the contaminated sulfur stream 202 may comprise at least about 1 weight percent, at least about 5 weight percent, at least about 10 weight percent, or at least about 25 weight percent contaminants. All percentages provided herein are on a wet basis unless otherwise stated. In addition, the contaminated sulfur stream 202 may comprise at least about 1 part per million (ppm), from about 5 ppm to about 15 ppm, or about 7 ppm mercaptans. The contaminated sulfur stream 202 may comprise solid particles, and as such may undergo particle size control through crushing, milling, roller milling, pressing, or other means prior to entering the reactor 102. Alternatively, the contaminated sulfur stream 202 may be a liquid stream or a slurry of some solid and some liquid components.

The solvent stream 204 may comprise any solvent that reacts with, dissolves, has an affinity for, or otherwise acts upon at least some of the contaminants in the contaminated sulfur stream 202. For example, the solvent may be an oxidizing or a reducing agent. In an embodiment, the solvent may be an aqueous phase liquid. For example, the solvent stream 204 may comprise an acid (such as hydrochloric acid, sulfuric acid, nitric acid, or combinations thereof), a hypochlorite (such as an alkali metal hypochlorite, an alkaline earth metal hypochlorite, or both), a peroxide-releasing compound (such as sodium perborate, sodium percarbonate, sodium persulfate, sodium perphosphate, urea peroxide, or combinations thereof), water, or combinations thereof. In an embodiment, the solvent stream 204 may comprise at least about 1 weight percent, from about 5 weight percent to about 20 weight percent, or about 10 weight percent of one or more of the aforementioned acids. Sulfuric acid solutions may be especially beneficial as they may reduce or substantially eliminate the formation of iron chloride, $H_2S$, or both. Additionally or alternatively, the solvent stream 204 may comprise at least about 0.01 weight percent, from about 0.1 weight percent to about 10 weight percent, or from about 1 weight percent to about 5 weight percent of the hypochlorite, the peroxide-releasing compound, or both. Alternatively, the solvent may be an organic phase solvent, such as acetone, benzene, or toluene. The solvent stream 204 may be in a liquid phase and/or may have a temperature of at least about 40° C., at least about 60° C., at least about 70° C., or at least about 80° C. In embodiments, the solvent stream 204 mass flow rate may be from about one-tenth of to about 18 times, from about 5 times to about 14 times, from about 8 times to about 10 times, or about 9 times the contaminated sulfur stream 202 mass flow rate.

In a specific embodiment, the solvent stream 204 may comprise one or more of the aforementioned acids and the hypochlorite, the peroxide-releasing compound, or both. Without being limited by theory, it is believed that the acid may act upon different contaminants than the hypochlorite or peroxide-releasing compound, and thus having both components in the solvent stream 204 may remove more of the contaminants than similar concentrations of the acid, the hypochlorite, or the peroxide-releasing compound individually. The weight ratio of the acid to the hypochlorite, the peroxide-releasing compound, or both in the solvent stream 204 may vary depending on the composition of the contaminants in the contaminated sulfur stream 202. For example, the mass of acid in the solvent stream 204 may be from about one-one hundredth of to about 1,000 times, from about equal to about 100 times, from about 5 times of to about 50 times, or about 10 times the mass of the hypochlorite, the peroxide-releasing compound, or both. In a specific embodiment, the solvent may comprise sulfuric acid and at least one of sodium hypochlorite and calcium hypochlorite. For example, the solvent may comprise at least about 1 weight percent sulfuric acid and at least about 0.1 weight percent sodium hypochlorite, calcium hypochlorite, or both.

The reactor 102 may be any device that contacts the contaminated sulfur stream 202 and the solvent stream 204 at process conditions suitable to allow the solvent to act upon the contaminants in the sulfur. The contaminated sulfur stream 202 and the solvent stream 204 may be received at the reactor 102 as separate streams or may be combined prior to entry into the reactor 102. If the contaminated sulfur stream 202 and/or the solvent stream 204 comprise a plurality of components, the component streams may be received at the reactor 102 as separate streams or may be combined prior to entry into the reactor 102. In an embodiment, the solvent reacts with, attracts, dissolves, or otherwise urges the contaminants into a liquid phase, while the sulfur remains in a solid phase. In such a case, the reactor 102 may be configured to operate at process conditions at which sulfur is a solid. Alternatively, the reactor 102 may be configured to operate at process conditions under which sulfur is a liquid. In any event, the reactor 102 may comprise one or a plurality of intermittent or continuous stirred tank reactors that may operate as a batch operation, a continuous operation, or combinations thereof. In a specific embodiment, the reactor 102 may be a stirred tank, a sparging tank, a static mixer, any other solid-liquid mixing apparatus, or combinations thereof. As such, the reactor 102 may be equipped with suitable agitation equipment, such as an impeller. Alternatively, the reactor 102 may be a plug flow reactor in which the contaminated sulfur stream 202 and the solvent stream 204 flow counter-current to each other, concurrent with each other, or in any other flow pattern. In addition, the reactor 102 may comprise temperature control equipment such as a heater or a cooler, control equipment such level sensors and control valves, and any other equipment that may be needed to implement the processes described herein.

The reactor 102 may produce the sulfur slurry stream 206. The sulfur slurry stream 206 may be a mixture of the components present in the contaminated sulfur stream 202 and the solvent stream 204, as well as any products produced by any reaction between the components in the contaminated sulfur stream 202 and the solvent stream 204. In embodiments, the sulfur slurry stream 206 may be substantially homogenous, may comprise a plurality of liquid phases such as an aqueous phase and an organic phase, or may comprise a combination of solid, liquid, and/or vapor phases.

The first separator 104 may separate the sulfur slurry stream 206 into the decontaminated sulfur stream 210 and the spent solvent stream 208. When the sulfur is in a solid phase, the first separator 104 may be any suitable solid-liquid separation equipment. For example, the first separator 104 may comprise a settling tank; belt, rotary, or other presses; centrifuges; vacuum drums; filters; other solids decanting equipment; or combinations thereof. When the sulfur is in a liquid phase, the first separator 104 may be any suitable liquid-liquid separation equipment. For example, the first separator 104 may comprise a knock-out drum, a distillation tower, liquid-liquid extraction equipment, or combinations thereof. In any case, the first separator 104 may comprise one or a plurality of stages, each of which may employ the same or different types of separation equipment.

The spent solvent stream 208 may comprise a mixture of the solvent described above, contaminants, and at least some of any products produced by the reaction between the components in the contaminated sulfur stream 202 and the solvent stream 204. For example, the spent solvent stream 208 may comprise at least about 50 weight percent, at least about 90 weight percent, at least about 95 weight percent, or substantially all of the contaminants from the sulfur slurry stream 206. In addition, the spent solvent stream 208 may comprise at least about 50 weight percent, at least about 90 weight percent, at least about 95 weight percent, or substantially all of the solvents from the sulfur slurry stream 206. The spent solvent stream 208 may also comprise some sulfur. The spent solvent stream 208 may be simply discarded, or may be treated using various processes. In an embodiment, at least some of the spent solvent stream 208 may be recycled into the solvent stream 204, for example after a filtering or treatment step to remove the contaminants from the solvent.

The decontaminated sulfur stream 210 may comprise sulfur and a reduced amount of contaminants as compared with the contaminated sulfur stream 202. For example, the decontaminated sulfur stream 210 may comprise at least about 90 weight percent, at least about 95 weight percent, at least about 99 weight percent, or substantially all of the sulfur from the sulfur slurry stream 206. In addition, the decontaminated sulfur stream 210 may comprise no more than about 10 weight percent, no more than about 5 weight percent, no more than about 1 weight percent, or be substantially free of solvent. The decontaminated sulfur stream 210 may also comprise no more than about 10 weight percent, no more than about 5 weight percent, no more than about 1 weight percent, or be substantially free of contaminants. Such a reduction in contaminants may represent a reduction of at least about 10 percent, at least about 25 percent, at least about 50 percent, at least about 75 percent, or at least about 90 percent of the contaminants in the contaminated sulfur stream 202.

The washing agent stream 212 may comprise any compound that removes at least some of the contaminants, solvent, or both from the decontaminated sulfur stream 210. For example, the washing agent may be steam or water having a temperature of at least about 10° C., at least about 60° C., at least about 70° C., or at least about 80° C. Alternatively, the washing agent may be any of the solvents described above. In an embodiment, washing agent stream 212 may also comprise detergents, surfactants, or other additives. In embodiments, the washing agent stream 212 mass flow rate may be no more than about 10 percent, no more than about 50 percent, about equal to, at least about 150 percent, or at least about 200 percent of the decontaminated sulfur stream 210 mass flow rate.

The washer 106 may be any device that contacts the decontaminated sulfur stream 210 and the washing agent stream 212 at process conditions suitable to allow the washing agent to act upon the contaminants, the solvent, or both in the sulfur. The decontaminated sulfur stream 210 and the washing agent stream 212 may be received at the washer 106 as separate streams or may be combined prior to entry into the washer 106. If the decontaminated sulfur stream 210 and/or the washing agent stream 212 comprise a plurality of components, the component streams may be received at the washer 106 as separate streams or may be combined prior to entry into the washer 106. In an embodiment, the washing agent reacts with, attracts, dissolves, or otherwise urges the solvent and/or contaminants into a liquid phase, while the sulfur remains in a solid phase. In such a case, the washer 106 may be configured to operate at process conditions at which sulfur is a solid. Alternatively, the washer 106 may be configured to operate at process conditions under which sulfur is a liquid. In any event, the washer 106 may comprise one or a plurality of intermittent or continuous stirred tank reactors that may operate as a batch operation, a continuous operation, or combinations thereof. In a specific embodiment, the washer 106 may be a stirred tank, a sparging tank, a static mixer, any other solid-liquid mixing apparatus, or combinations thereof. As such, the washer 106 may be equipped with suitable agitation equipment, such as an impeller. Alternatively, the washer 106 may be a plug flow reactor in which the contaminated sulfur stream 202 and the solvent stream 204 flow counter-current to each other, concurrent with each other, or in any other flow pattern. In addition, the washer 106 may comprise temperature control equipment such as a heater or a cooler, control equipment such as level sensors and control valves, and any other equipment that may be needed to implement the processes described herein.

The washer 106 may produce the clean sulfur stream 214. The clean sulfur stream 214 may be a mixture of the components present in the decontaminated sulfur stream 210 and the washing agent stream 212, as well as any products produced by any reaction between the components in the decontaminated sulfur stream 210 and the washing agent stream 212. In embodiments, the clean sulfur stream 214 may be substantially homogenous, may comprise a plurality of liquid phases such as an aqueous phase and an organic phase, or may comprise a combination of solid, liquid, and/or vapor phases.

The second separator 108 may separate the clean sulfur stream 214 into the purified sulfur stream 218 and the spent washing agent stream 216. When the sulfur is in a solid phase, the second separator 108 may be any suitable solid-liquid separation equipment. For example, the second separator 108 may comprise a settling tank; belt, rotary, or other presses; centrifuges; vacuum drums; filters; other solids decanting equipment; or combinations thereof. When the sulfur is in a liquid phase, the second separator 108 may be any suitable liquid-liquid separation equipment. For example, the second separator 108 may comprise a knock-out drum, a distillation tower, liquid-liquid extraction equipment, or combinations thereof. In any case, the second separator 108 may comprise one or a plurality of stages, each of which may employ the same or different types of separation equipment. In a specific embodiment, the second separator 108 may be a dryer that uses heat, a vacuum, or both to evaporate the solvent and/or washing agent from the sulfur. In such a case, the moisture, e.g., the washing agent and/or solvent, may be removed from the dryer via the spent washing agent stream 216 or may simply be vented.

The spent washing agent stream 216 may comprise a mixture of the solvent described above, any remaining contaminants, and at least some of any products produced by the reaction between the components in the decontaminated sulfur stream 210 and the washing agent stream 212. For example, the spent washing agent stream 216 may comprise at least about 90 weight percent, at least about 95 weight percent, at least about 99 weight percent, or substantially all of the solvent from the clean sulfur stream 214. In addition, the spent washing agent stream 216 may comprise at least about 50 weight percent, at least about 90 weight percent, at least about 95 weight percent, or substantially all of the washing agent from the clean sulfur stream 214. In some embodiments, the spent washing agent stream 216 may comprise at least about 50 weight percent, at least about 90 weight percent, at least about 95 weight percent, or substantially all of the contaminants from the clean sulfur stream 214. The spent washing agent stream 216 may also comprise some sulfur. The spent washing agent stream 216 may be simply discarded, or may be treated using various processes. In an embodiment, at least some of the spent washing agent stream 216 may be recycled into the washing agent stream 212, for example after a filtering or treatment step to remove the contaminants from the solvent.

The purified sulfur stream 218 may comprise sulfur and a reduced amount of contaminants, washing agent, solvent, or combinations thereof as compared with the clean sulfur stream 214 and/or the decontaminated sulfur stream 210. For example, the purified sulfur stream 218 may comprise at least about 90 weight percent, at least about 95 weight percent, at least about 99 weight percent, or substantially all of the sulfur from the clean sulfur stream 214. The decontaminated sulfur stream 210 may also comprise no more than about 10 weight percent, no more than about 5 weight percent, no more than about 1 weight percent, no more than about 0.1 weight percent, or be substantially free of solvent. Similarly, the decontaminated sulfur stream 210 may also comprise no more than about 10 weight percent, no more than about 5 weight percent, no more than about 1 weight percent, no more than about 0.1 weight percent, or be substantially free of the washing agent. In addition, the purified sulfur stream 218 may comprise no more than about 5 weight percent, no more than about 1 weight percent, no more than about 0.1 weight percent, or be substantially free of contaminants. Such a reduction in contaminants may represent a reduction of at least about 10 weight percent, at least about 25 weight percent, at least about 50 weight percent, at least about 75 weight percent, or at least about 90 weight percent of the contaminants in the clean sulfur stream 214.

The purified sulfur stream 218 may be heated in a heater 110. The heater 110 may operate at process conditions suitable to homogenize the sulfur, reduce or substantially eliminate any remaining washing agent and/or solvent, make the sulfur more suitable for sale or transportation, or combinations thereof. The heater 110 may be any apparatus suitable to increase the temperature of the sulfur, such as a tank, a heat exchanger, or any other suitable apparatus. For example, the heater 110 may heat the sulfur to at least about 100° C., at least about 115° C., or at least about 130° C. The heater 110 may also comprise a cooler that cools the sulfur after the heating occurs. For example, the cooler may comprise a tank, a heat exchanger, or any other suitable apparatus that cools the sulfur to about 100° C., about 60° C., about 30° C., or about ambient temperature.

The heater 110 may produce the refined sulfur stream 220. The refined sulfur stream 220 may have a composition similar to the purified sulfur stream 218, but may have a reduced amount of moisture and/or solvent. The refined sulfur stream 220 may comprise sulfur and a reduced amount of contaminants as compared with the contaminated sulfur stream 202. For example, the refined sulfur stream 220 may comprise at least about 80 weight percent, at least about 90 weight percent, at least about 95 weight percent, at least about 98 weight percent, or substantially all of the sulfur from the clean sulfur stream 214. The refined sulfur stream 220 may comprise no more than about 5 weight percent, no more than about 1 weight percent, no more than about 0.1 weight percent, or be substantially free of contaminants. Such a reduction in contaminants may represent a reduction of at least about 10 weight percent, at least about 50 weight percent, at least about 75 weight percent, at least about 90 weight percent, at least about 95 weight percent, or at least about 99 weight percent of the contaminants in the contaminated sulfur stream 202. The refined sulfur stream 220 may be in a liquid form, or if sufficiently cool, may be in a solid form, such as a powder, a wet cake, flakes, or other solid form.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A process comprising:
    contacting a solvent with a sulfur stream comprising sulfur and a contaminant, wherein the solvent is an aqueous phase solvent;
    separating the sulfur from at least some of the contaminant and at least some of the solvent, thereby producing a decontaminated sulfur stream;
    contacting the decontaminated sulfur with a washing agent; and
    separating the sulfur from at least some of the washing agent, thereby producing a purified sulfur stream comprising elemental sulfur.

2. The process of claim 1 further comprising heating the purified sulfur stream to homogenize the sulfur, reduce or substantially eliminate any remaining washing agent and/or solvent, make the sulfur more suitable for sale or transportation, or combinations thereof.

3. The process of claim 1, wherein the contaminant comprises metals, chelated metals, organic compounds, organometallic compounds, ash, thiosulfates, bicarbonates, mercaptans, or combinations thereof.

4. The process of claim 1, wherein the contaminated sulfur stream comprises at least about 10 weight percent contaminants.

5. The process of claim 1, wherein the contaminated sulfur stream comprises at least about 1 part per million (ppm) mercaptans.

6. The process of claim 1, wherein the solvent comprises an acid and at least one of a hypochlorite and a peroxide-releasing compound.

7. The process of claim 1, wherein the solvent comprises sulfuric acid and at least one of sodium hypochlorite and calcium hypochlorite.

8. The process of claim 1, wherein the solvent comprises at least about 1 weight percent sulfuric acid and at least about 0.1 weight percent sodium hypochlorite, calcium hypochlorite, or both.

9. The process of claim 1, wherein the solvent has a mass flow rate from about 5 times to about 14 times a mass flow rate of the sulfur stream.

10. The process of claim 1, wherein the decontaminated sulfur stream comprises no more than about 1 weight percent contaminants.

11. The process of claim 1, wherein the purified sulfur stream comprises at least about 99 weight percent elemental sulfur and is substantially free of any mercaptans.

12. The process of claim 1, wherein the purified sulfur stream is in the form of a powder, a wet cake, a plurality of flakes, or combinations thereof.

13. The process of claim 1, wherein at least some of the sulfur is in a solid phase during the separation of the sulfur from at least some of the washing agent.

14. A process comprising:
    contacting an aqueous phase solvent with a sulfur stream comprising elemental sulfur and a plurality of contaminants, wherein the contaminants comprise metals, organic compounds, ash, and mercaptans;
    separating the sulfur from at least some of the contaminants and at least some of the solvent, thereby producing a decontaminated sulfur stream;
    contacting the decontaminated sulfur with water;
    separating the sulfur from at least some of the water; and
    heating the purified sulfur stream to homogenize the sulfur, reduce or substantially eliminate any remaining water and/or solvent, make the sulfur more suitable for sale or transportation, or combinations thereof, thereby producing a refined sulfur stream comprising at least about 95 weight percent elemental sulfur.

15. The process of claim 14, wherein the solvent comprises sulfuric acid and a hypochlorite.

16. The process of claim 15, wherein the solvent comprises from about 5 weight percent to about 20 weight percent of the sulfuric acid and from about 0.5 weight percent to about 10 weight percent of the hypochlorite.

17. The process of claim 14, wherein at least some of the sulfur is in a solid phase during the separation of the sulfur from at least some of the water.

18. An apparatus comprising:
    a reactor configured to receive a sulfur stream and a solvent stream and produce a sulfur slurry stream, wherein the sulfur stream comprises sulfur and a contaminant;
    a first separator configured to receive the sulfur slurry stream and produce a spent solvent stream and a decontaminated sulfur stream;
    a washer configured to receive the decontaminated sulfur stream and a washing agent stream and produce a clean sulfur stream;
    a second separator configured to receive the clean sulfur stream and produce a spent washing agent stream and a purified sulfur stream; and
    a heater configured to receive the purified sulfur stream and produce a refined sulfur stream.

19. The apparatus of claim 18, wherein the solvent stream comprises from about 5 weight percent to about 20 weight percent of an acid and from about 0.5 weight percent to about 10 weight percent of a hypochlorite, and wherein the purified sulfur stream comprises elemental sulfur and no more than about 5 weight percent of the contaminant.

20. A process comprising:
    contacting a solvent with a sulfur stream comprising sulfur and a contaminant;
    separating the sulfur from at least some of the contaminant and at least some of the solvent, thereby producing a decontaminated sulfur stream;
    contacting the decontaminated sulfur with a washing agent; and
    separating the sulfur from at least some of the washing agent, thereby producing a purified sulfur stream comprising elemental sulfur,
    wherein at least some of the sulfur is in a solid phase during the separation of the sulfur from at least some of the washing agent.

21. The process of claim 20 further comprising:
    heating the purified sulfur stream to homogenize the sulfur, reduce or substantially eliminate any remaining washing agent and/or solvent, make the sulfur more suitable for sale or transportation, or combinations thereof, wherein the contaminated sulfur stream comprises at least about 10 weight percent contaminants, wherein the contaminant comprises metals, chelated metals, organic compounds, organometallic compounds, ash, thiosulfates, bicarbonates, mercaptans, or combinations thereof, wherein the contaminated sulfur stream comprises at least about 1 part per million (ppm) mercaptans, wherein the solvent is an aqueous phase solvent comprising from about 5 weight percent to about 20 weight percent sulfuric acid and from about 0.5 weight percent to about 10 weight percent of at least one of sodium hypochlorite and calcium hypochlorite, wherein the solvent has a mass flow rate from about 5 times to about 14 times a mass flow rate of the sulfur stream, wherein the decontaminated sulfur stream comprises no more than about 1 weight percent contaminants, wherein the washing agent comprises water, wherein the purified sulfur stream comprises at least about 99 weight percent elemental sulfur and is substantially free of any mercaptans, and wherein the purified sulfur stream is in the form of a powder, a wet cake, a plurality of flakes, or combinations thereof.

* * * * *